United States Patent
Tu et al.

(10) Patent No.: US 7,386,065 B2
(45) Date of Patent: Jun. 10, 2008

(54) VOLTAGE CONTROLLED OSCILLATOR (VCO) SUITABLE FOR USE IN FREQUENCY SHIFT KEYING (FSK) SYSTEM

(75) Inventors: Yih-Min Tu, Hualien (TW);
Yung-Lung Chen, Taipei (TW);
Yuan-Tung Peng, Hsinchu (TW);
Fan-Chung Lee, Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 677 days.

(21) Appl. No.: 10/643,790

(22) Filed: Aug. 15, 2003

(65) Prior Publication Data

US 2005/0036567 A1 Feb. 17, 2005

(51) Int. Cl.
*H03D 3/00* (2006.01)

(52) U.S. Cl. ............... 375/334; 375/148; 375/374; 257/480; 352/136; 438/379; 455/169.2; 455/180.4; 455/191.2; 455/193.3

(58) Field of Classification Search ........... 375/331, 375/334, 219; 331/17, 34, 36, 177, 10, 108 B; 455/182.2, 252.1

See application file for complete search history.

(56) References Cited

U.S. PATENT DOCUMENTS

| | | | | | |
|---|---|---|---|---|---|
| 3,962,640 | A | * | 6/1976 | Bomba | 455/182.2 |
| 5,629,652 | A | * | 5/1997 | Weiss | 331/108 B |
| 5,650,754 | A | * | 7/1997 | Joshi et al. | 331/36 C |
| 6,091,304 | A | * | 7/2000 | Harrer | 331/10 |
| 6,163,568 | A | * | 12/2000 | Lansford et al. | 375/219 |
| 2003/0052744 | A1 | * | 3/2003 | Suto | 332/177 |

* cited by examiner

*Primary Examiner*—David C. Payne
*Assistant Examiner*—Adolf DSouza
(74) *Attorney, Agent, or Firm*—J.C. Patents

(57) ABSTRACT

A voltage controlled oscillator (VCO), suitable for use in a frequency shift keying (FSK) system. The VCO device comprises a switching varactor unit, having a first terminal and a second terminal, wherein the switching varactor unit produces a capacitance, according to a frequency-selection voltage. A VCO core has a first output terminal, a second output terminal complementary to the first output terminal, and an input terminal. Wherein, the switching varactor unit is coupled in parallel with the VCO core at the first output terminal and the second output terminal to produce a capacitance effect with respect to the capacitance, so as to adjust a frequency constant $\sqrt{LC}$ of the VCO core.

11 Claims, 3 Drawing Sheets

VOLTAGE CONTROLLED OSCILLATOR (VCO) SUITABLE FOR USE IN FREQUENCY SHIFT KEYING (FSK) SYSTEM

BACKGROUND OF THE INVENTION

1. Field of Invention

The present invention relates to a frequency shift keying (FSK) modulator. More particularly, the present invention relates to a voltage controlled oscillator (VCO) suitable for use in a FSK system.

2. Description of Related Art

An oscillator is an electric or electronic circuit that produces an output signal that oscillates at a principal oscillation frequency and, in some instances, contains harmonic frequency signals (i.e., signals having frequencies that are multiples of the principal oscillation frequency). Some oscillators have a principal oscillation frequency that may be varied by the application of a suitable control voltage. Oscillators of this type, called voltage-controlled oscillators or VCO's, are used in many communication and other signal-processing applications. Because suppression or reduction of higher-order harmonics of the principal oscillation frequency and other noise in the output signal of a VCO is often desirable.

In a VCO for switching oscillation frequency bands by supplying a band switching signal to an LC resonator circuit that is connected in a phase locked loop having a phase comparator and a loop filter and sets oscillation frequencies, the LC resonator circuit includes at least one inductor and one capacitor, the connection and non-connection of a part of which are switched in response to a band switching signal and a capacitor element. Wherein, a voltage variable capacitor, or called varactor, element whose capacitance value is adjusted in response to the control voltage from the loop filter is connected in series to impedance elements acting as a composite element that exhibits a capacitance value in oscillation frequency ranges. With this arrangement, when an oscillation signal is selectively output in a high or low frequency band by switching the LC resonator circuit, the voltage controlled oscillator can increase the difference between the rates of change in the high and low frequency bands.

In communication system, the VCO is implemented in a FSK modulator. FIG. 1 is a block diagram, schematically illustrating the conventional FSK modulator. In FIG. 1, a conventional FSK modulator includes a VCO 20, a frequency divider 22, a low pass filter (LF) 24, and a frequency mixer 26. The VCO 20 further includes an oscillator for producing a $f_{osc} \propto 1/\sqrt{LC}$, where C contains all related capacitance at VCO output. The frequency divider 22 is used for dividing the oscillation output. The mixer 26 is used for synthesizing frequency of the divided output with that of a reference wave signal. The LF 24 is used for removing high-frequency components of this output. The input data (DATA) is, for example, a no-return-zero (NRZ). In addition, it is assumed that a data row of the input data is temporarily at a 0 or 1 in voltage signal level.

In wireless communication, the digital binary data is carried by a central frequency f0 for transmission. FIG. 2 is a drawing, schematically the typical frequency spectrum of FSK. In order to represent the digital value 0 and digital value 1, a positive frequency shift +fm and a negative frequency shift −fm are used. In the configuration of FIG. 1, the frequency of the reference signal which is an output of a reference signal generator which is not shown is synthesized with that of a divided output of the frequency divider 22 by means of the mixer 26 so as to output a desired frequency f0. The VCO 20 detects an output of the mixer 26 and converts it to a voltage so as to synthesize it with a voltage level (0 [V] or 1 [V]) of a data row. For example, an output frequency of the VCO 20 becomes a frequency f1 (f1=f0−fm1) when a voltage level of a data row is at level 0 [V] and it becomes a frequency f4 (f2=f0+fm4) when it is at level 1 [V], so that there is a difference of fm1+fm4 between these frequencies. As described above, the FSK modulation is achieved by shifting a frequency from the intermediate frequency f0 by ±fm. Since the actual frequency being used is not a fixed value, and can be varied. Therefore, various frequency shifts are necessary to be set, in order to have the optimal frequency to transmit data without errors.

Conventionally, the frequency fi can be selected by setting different voltage Vi. The desired frequency spacing between digital level 0 [V] and 1 [V] can be obtained by selecting a pair of frequency [fi, fj] with the desired frequency spacing.

However, in the conventional FSK modulator, the frequency spacing is fixed. There is no way to further adjust the frequency spacing to get more precise frequency spacing. If the frequency is more precise, the data error is less. Therefore, it is an issue about how to get more precise frequency spacing to represent the binary data.

SUMMARY OF THE INVENTION

The invention provides a VCO circuit, of which the characteristic frequency of VCO core can be shifted by coupling in parallel with a switching varactor unit. The switching varactor unit changes the frequency constant $\sqrt{LC}$ of the VCO core, so as to shift the operation frequency and the frequency spacing.

The invention provides a FSK modulator, which includes switching varactor unit coupled with a VCO core in parallel, so that the operation frequency and the frequency spacing can be adjusted to the optimal condition. As a result, the errors occurring in data transmission can be effectively reduced.

As embodied and broadly described herein, the invention provides a voltage controlled oscillator (VCO), suitable for use in a frequency shift keying (FSK) system. The VCO device comprises a switching varactor unit, having a first terminal and a second terminal, wherein the switching varactor unit produces a capacitance, according to a frequency-selection voltage. A VCO core has a first output terminal, a second output terminal complementary to the first output terminal, and an input terminal. Wherein, the switching varactor unit is coupled in parallel with the VCO core at the first output terminal and the second output terminal to produce a capacitance effect with respect to the capacitance, so as to adjust a frequency constant $\sqrt{LC}$ of the VCO core.

In the foregoing VCO device, the switching varactor unit comprises a switching diode unit for receiving a mode selection signal with at least one bit data, wherein the switching diode unit includes:

a plurality of diode pairs coupled in parallel, wherein the diode pairs can be switched on with respect to a quantity of the mode selection signal, so as to produce the capacitance, wherein the diode pair has one common terminal coupled to the frequency-selection voltage and another terminals coupled to the first terminal and the second terminal, respectively.

The present invention further provides a frequency shift keying (FSK) system, comprising: a frequency selection unit, for receiving an input signal and a mode selection signal, and exporting a frequency-selection voltage according to the mode selection signal. A switching varactor unit has a first terminal and a second terminal, wherein the switching varactor unit produces a capacitance, according to a frequency-selection voltage. A VCO core has a first output terminal, a second output terminal complementary to the first output terminal, and an input terminal. Wherein, the switching varactor unit is coupled in parallel with the VCO core at the first output terminal and the second output terminal to produce a capacitance effect with respect to the capacitance, so as to adjust a frequency constant $\sqrt{LC}$ of the VCO core. A first VCO buffer is coupled to the first output terminal of the VCO core and exporting a desired frequency. A second VCO buffer is coupled to the second output terminal of the VCO core. A phase locked loop unit is coupled between an output of the second VCO buffer and the input terminal of the VCO core to form a feedback loop and produce the desired frequency.

The invention also provides a method to adjust an operation frequency of a voltage controlled oscillator (VCO) core. The method comprises providing a voltage controlled oscillator (VCO) core, having an output terminal, a feedback output terminal complementary to the output terminal, and an input terminal. The feedback output terminal and the input terminal form a feedback loop through a phase locked loop unit. A switching varactor unit is provided for producing a capacitance with respect to a mode selection signal. The switching varactor unit is coupled with the VCO core in parallel, so as to shift a frequency constant $\sqrt{LC}$ of the VCO core.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

The present invention is directed to a VCO device, of which the characteristic frequency of VCO core can be shifted by coupling in parallel with a switching varactor unit. The switching varactor unit changes the frequency constant $\sqrt{LC}$ of the VCO core, so as to shift the operation frequency and the frequency spacing. In addition, the VCO device of the invention can be implemented into a FSK modulator, so that the operation frequency and the frequency spacing can be adjusted to the optimal condition. As a result, the errors occurring in data transmission can be effectively reduced. An example is provided for describing the features of the present invention as follows.

Figure 3:
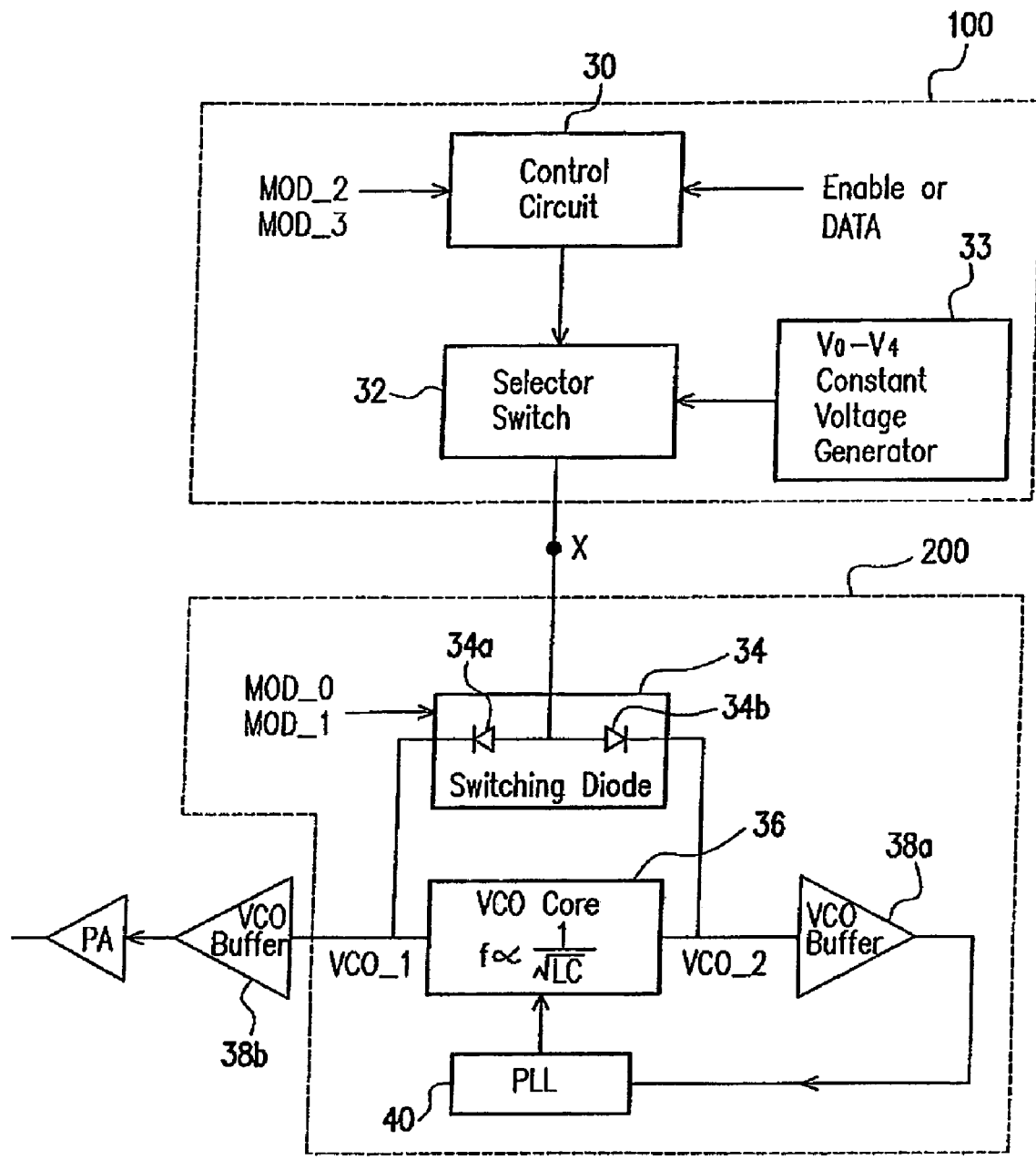
FIG. 3 is a circuit block diagram, schematically illustrating configuration of a FSK system, according to one preferred embodiment of this invention.

FIG. 3 is a circuit block diagram, schematically illustrating configuration of a FSK system, according to one preferred embodiment of this invention. In FIG. 3, the FSK system or FSK modulator includes a frequency selection unit 100, a VCO unit 200, buffers 38a, 38b, and a PLL unit 40.

Figure 1:
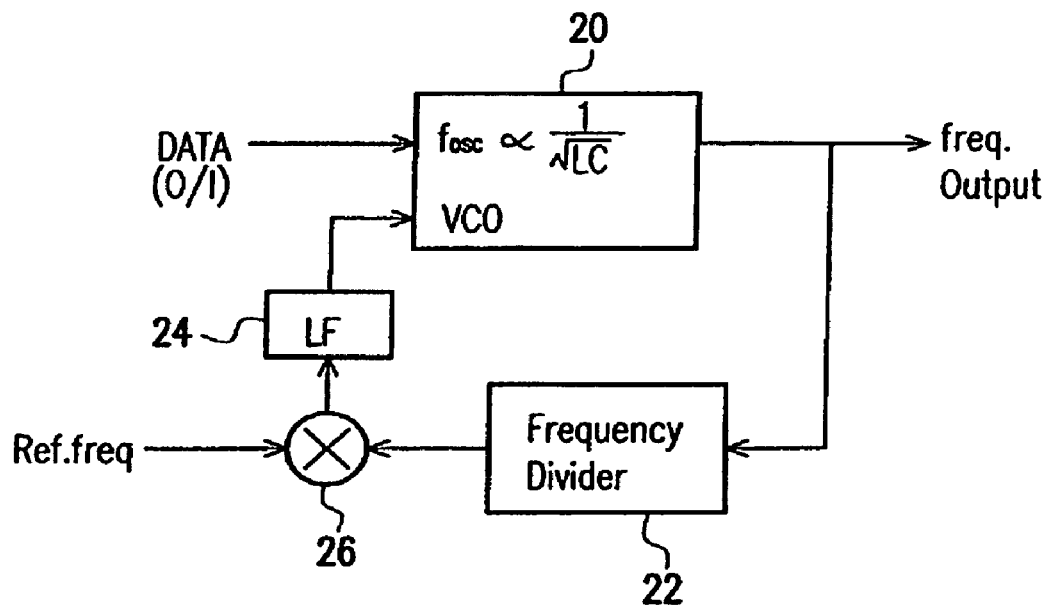
FIG. 1 is a circuit block diagram, schematically illustrating configuration of a conventional FSK modulator.
Figure 2:
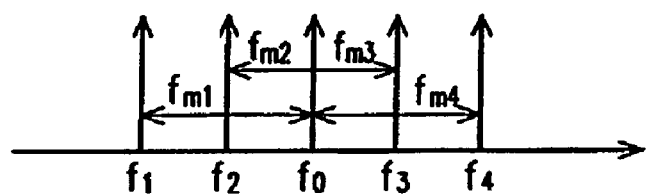
FIG. 2 is a drawing, showing the typical frequency spectrum of FSK.

The frequency selection unit 100 is used to receive an input signal of data or enabling and mode selection signals Mod_2, Mod_3 and export a frequency-selection voltage at a node X, according to the mode selection signals. The frequency selection unit 100 includes, for example, a control circuit 30, and selector switch 32, and a constant voltage generator 33. The control circuit 30 receives input signal DATA or ENABLE and mode selection signals Mod_2, Mod_3, and then export a control signal to the selector switch 32. The DATA is either 0 or 1, and the ENABLE signal deter-mines whether or not the modulation signal is transmitted. The selector switch 32 also receives a voltage signal from the constant voltage generator 33. The constant voltage generator 33, for example, can generate five voltage levels in a relation, such as V1>V2>V0>V3>V4. As described in FIG. 2, the frequency spacing is selected according to the voltage. For example, (V1 & V2) represent the "0" level, and (V3 & V4) represent the "1" level. V0 is un-modulated voltage before modulation. The desired frequency spacing can be obtained by properly adjusting the voltage value. The frequency spacing can be combination of fmi, such as [fm1, fm4], [fm1, fm3], [fm2, fm4] or [fm2, fm3]. The frequency selection unit 100 then exports a signal of frequency-selection voltage at the node X.

The VCO unit 200, coupled to the node X, further includes a switching varactor unit 34 and a VCO core 36. The switching varactor unit 34 can, for example, be a switching diode unit 34 having at least a diode 34a and at least a second diode 34b, which form as a diode pair. The switching diode unit 34 will be described in detail later. The positive ends of the diodes are commonly coupled to the node X and output ends of the diode are a first terminal and a second terminal. The switching varactor unit 34 produces a capacitance, according to the frequency-selection voltage.

The VCO core 36, having a first output terminal VCO_1, a second output terminal VCO_2 complementary to the first output terminal VCO_1, and an input terminal. It should be noted that the switching varactor unit 34 is coupled in parallel with the VCO core 36 at the first output terminal VCO_1 and the second output terminal VCO_1 to produce a capacitance effect with respect to the capacitance produced from the switching diode unit 34, so as to adjust a frequency constant $\sqrt{LC}$ of the VCO core 36.

In the invention, since the VCO core 36 is coupled in parallel with the switching varactor unit 34, the frequency constant $\sqrt{LC}$ can be further adjusted by adjusting the capacitance C, so as to have the frequency spacing in more precise value. This can effectively reduce the data errors. The design of VCO unit 200 with the switching varactor unit 34 in the invention is obviously novel to the prior art.

In order to have the practical application of the FSK modulator, the output terminal VCO_2 of the VCO unit 200 is coupled back to the input terminal through the VCO buffer 38a and the PLL 40. The feedback loop can lock the desired frequency. The output terminal VCO_1 is complementary to the output terminal VCO_2 and then output the desired frequency signal. Usually, another VCO buffer 38b is coupled to the output terminal VCO_1 of the VCO core 36, and then a power amplifier (PA) is coupled to the VCO buffer 38b to amplify the frequency signal.

For the FSK system of the invention, since the frequency spacing in the VCO unit 200 can be further shifted by varying the capacitance of the switching varactor unit 34, the data error can be effectively reduced during transmission. The invention can improve the communication quality.

Figure 4:
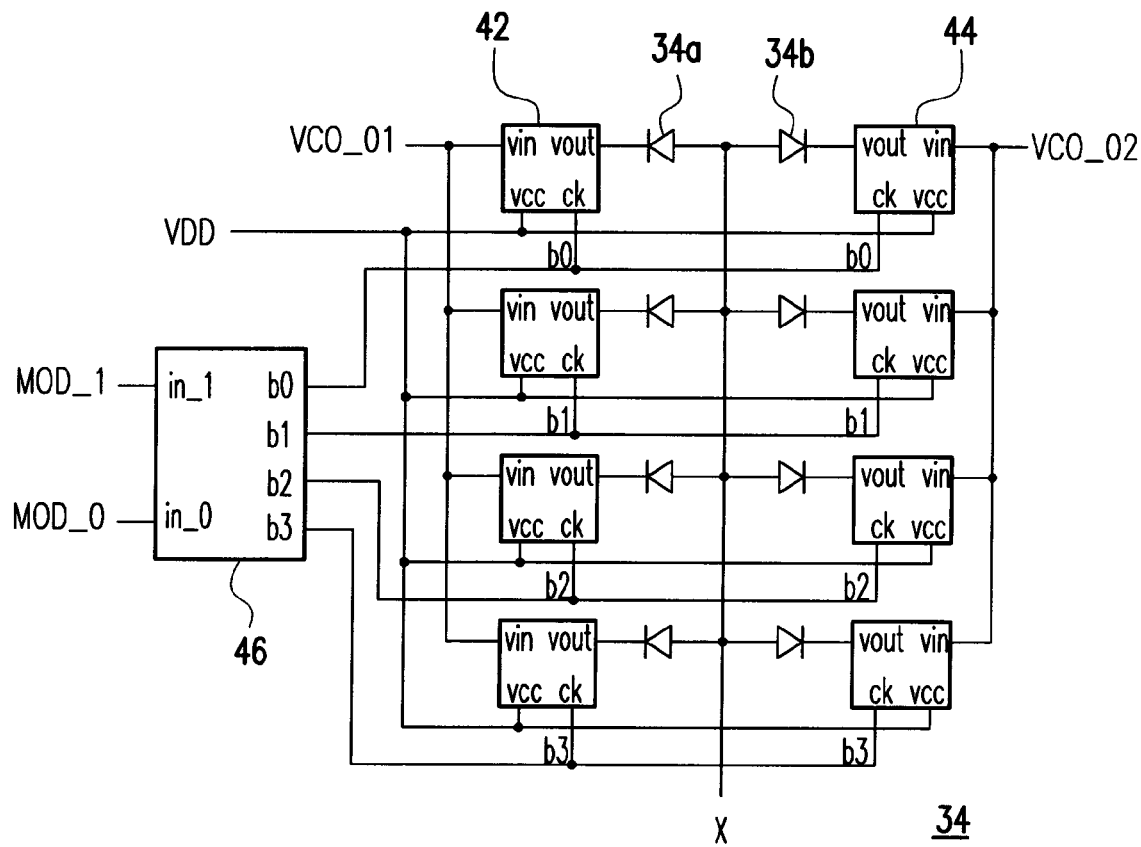
FIG. 4 is a circuit diagram, schematically illustrating a circuit architecture of a switching varactor unit used in the FSK system, according to one preferred embodiment of this invention.

In the foregoing switching varactor unit 34, it can be designed as the circuit architecture shown in FIG. 4. In FIG. 4, the switching varactor is designed by using bipolar junction diode or metal-oxide semiconductor (MOS) diode. The switching diode unit include a decoder 46 and a diode pair part. Each diode pair has a diode 34a, and a diode 34b coupled in reverse direction. In other words, the positive ends are commonly coupled to the node X and the other ends of the diodes are coupled to, the switching device 42 and 44, respectively. The output end of the switching device 42 is the output terminal VCO_1, and the output end of the switching device 44 is the output terminal VCO_2. The diode pairs are coupled in parallel.

The decoder 46 receives a digital signal with at least one bit. In the example, two bits of Mod_1 and Mod_0 are used for descriptions. The decoder 46 has the output channels b0-b3, which have the number equal to 2n, where n is the input bit number. In the example, n=2. The output channels are respectively coupled to the switching devices 42 and 44 for each diode pairs. The decoder then decodes the quantity of the digital signal and applying the enabling signal to the switching devices, accordingly. For example, when the data 00 is received, then the b0 channel is at enable state, and then the switching devices 42, 44 at the first channel are turned on. Then, the capacitance contributed form the diodes is enabled and added to the VCO core 36 (see FIG. 3). Likewise, if the binary digital data 10 is received, then channels b0 and b2 are turned on. The capacitance from the two channels are added together to have another quantity of capacitance.

Since the diode is the varactor diode, the capacitance is also depending on the frequency-selection voltage at the node X. By this design, the switching diode unit 34 is coupled with the VCO core 36 in parallel, so as to provide the desired capacitance and properly shift the frequency spacing in better precision.

From the operation point of view, the invention can further adjust the frequency spacing by coupling the switching varactor unit 34 with the VCO core 36 in parallel, so as to shift a frequency constant $\sqrt{LC}$ of the VCO core.

Figure 5:
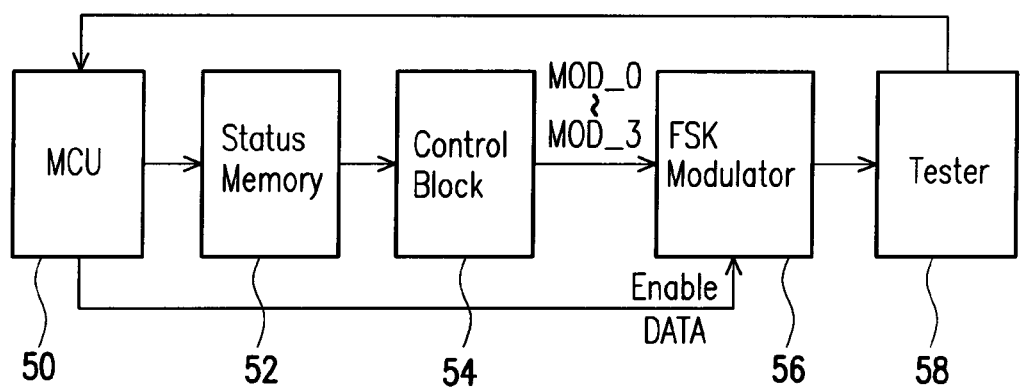
FIG. 5 is a process diagram, showing a testing procedure for the FSK modulator, according to one preferred embodiment of this invention.

In order to obtain the desired frequency spacing for the FSK modulator, a procedure can be performed, as shown in FIG. 5. In FIG. 5, a micro control unit (MCU) 50, a status memory 52, a control block 54, a FSK modulator, and a tester 58 are coupled in cascade manner as a testing loop. The MCU 50 send the signal of ENABLE or DATA to the FSK modulator 56. The selection signals of Mod_0-Mod_3 are first chosen. Then the tester 58 tests the data transmission error. The selection signals of Mod_0-Mod_3 are then stored in the status memory 52 and written to the control block 54 when each time of power. The test procedure is repeated by changing the selection signals of Mod_0-Mod_3 until the test result satisfies the requirement. The procedure in FIG. 5 is a routing work to estimate the frequency spacing.

In conclusions, the invention has introduce the VCO unit, which include the VCO core 36 and the switching varactor unit 34, coupled in parallel. In this design, the frequency constant $\sqrt{LC}$ of the VCO core can be more precisely adjusted. As a result, the error in data transmission can be effectively reduced.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A voltage controlled oscillator (VCO) device, suitable for use in a frequency shift keying (FSK) system, the VCO device comprising:
    a switching varactor unit, having a first terminal and a second terminal, wherein the switching varactor unit has at least a first diode and a second diode, the positive ends of the first diode and the second diode are commonly coupled to a node, and the node receives a frequency-selection voltage, such that the switching varactor unit produces a capacitance according to the frequency-selection voltage;
    a VCO core, having a first output terminal, a second output terminal complementary to the first output terminal, and an input terminal, wherein the switching varactor unit is coupled in parallel with the VCO core at the first output terminal and the second output terminal to produce a capacitance effect with respect to the capacitance, so as to adjust a frequency constant $\sqrt{LC}$ of the VCO core; and
    a frequency selection unit for outputting the frequency-selection voltage, wherein the frequency selection unit comprises:
        a control circuit, for receiving an input signal and a mode selection signal and outputting a control signal according to the mode selection signal;
        a constant voltage generator, for generating a plurality of voltage levels; and
        a selector switch, coupled to the control circuit and the constant voltage generator, for selecting one of the voltage levels to be served as the frequency-selection voltage according to the control signal.

2. The VCO device of claim 1, wherein the switching varactor unit comprises a switching diode unit for receiving a mode selection signal with at least one bit data, wherein the switching diode unit includes:
    a plurality of diode pairs coupled in parallel, wherein the diode pairs can be switched on with respect to a quantity of the mode selection signal, so as to produce the capacitance, wherein the diode pair has one common terminal coupled to the node and another terminals coupled to the first terminal and the second terminal, respectively.

3. The VCO device of claim 2, wherein each diode of diode pairs also coupled with a switching device controlled by the mode selection signal.

4. The VCO device of claim 3, wherein the switching varactor unit further comprises a decoder to decode the mode selection signal into a plurality of channels with respect to the diode pairs for controlling the switching device, so whether each of diode pairs outputting their capacitance or not is controlled by the channels respectively.

5. A frequency shift keying (FSK) system, for outputting a desired frequency, the FSK system comprising:
    a frequency selection unit, for receiving an input signal and a mode selection signal, and exporting a frequency-selection voltage according to the mode selection signal, the frequency selection unit comprising:
- a control circuit, for receiving the input signal and the mode selection signal and outputting a control signal according to the mode selection signal;
- a constant voltage generator, for generating a plurality of voltage levels; and
- a selector switch, coupled to the control circuit and the constant voltage generator, for selecting one of the voltage levels to be served as the frequency-selection voltage according to the control signal;

a switching varactor unit, having a first terminal and a second terminal, wherein the switching varactor unit has at least a first diode and a second diode, the positive ends of the first diode and the second diode are commonly coupled to a node, and the node receives the frequency-selection voltage, such that the switching varactor unit produces a capacitance according to the frequency-selection voltage; and a VCO core, having a first output terminal, a second output terminal complementary to the first output terminal, and an input terminal, wherein the switching varactor unit is coupled in parallel with the VCO core at the first output terminal and the second output terminal to produce a capacitance effect with respect to the capacitance, so as to adjust a frequency constant $\sqrt{LC}$ of the VCO core;

a first VCO buffer, coupled to the first output terminal of the VCO core and exporting a desired frequency;

a second VCO buffer, coupled to the second output terminal of the VCO core; and a phase locked loop unit, coupled between an output of the second VCO buffer and the input terminal of the VCO core to form a feedback loop and produce the desired frequency.

6. The FSK system of claim 5, wherein the switching varactor unit comprises a switching diode unit for receiving the mode selection signal, wherein the switching diode unit includes:
- a plurality of diode pairs coupled in parallel, wherein the diode pairs can be switched on with respect to a quantity of the mode selection signal, so as to produce the capacitance, wherein diodes of each diode pair have a common terminal coupled to the node and another terminals coupled to the first terminal and the second terminal, respectively.

7. The FSK system of claim 6, wherein the diode pairs comprise bipolar junction varactor diode or metal-oxide semiconductor (MOS) varactor diode.

8. The FSK system of claim 6, wherein each diode of the diode pairs also coupled with a switching device controlled by the mode selection signal.

9. The FSK system of claim 8, wherein the switching varactor unit further comprises a decoder to decode the mode selection signal into a plurality of channels with respect to the diode pairs for controlling the switching device, so whether each of diode pairs outputting their capacitance or not is controlled by the channels respectively.

10. A method to adjust an operation frequency of a voltage controlled oscillator (VCO) core, comprising
- providing a voltage controlled oscillator (VCO) core, having an output terminal, a feedback output terminal complementary to the output terminal, and an input terminal, wherein the feedback output terminal and the input terminal form a feedback loop through a phase locked loop unit;
- providing a switching varactor unit, for producing a capacitance with respect to a mode selection signal, wherein the switching varactor unit has at least a first diode and a second diode, the positive ends of the first diode and the second diode are commonly coupled to a node, and the node receives a frequency-selection voltage; and
- coupling the switching varactor unit with the VCO core in parallel, so as to shift a frequency constant $\sqrt{LC}$ of the VCO core, wherein the VCO core of a VCO device comprises a frequency selection unit for outputting the frequency-selection voltage, and the frequency selection unit comprises a control circuit, a constant voltage generator, and a selector switch, wherein the control circuit is for receiving an input signal and a mode selection signal and outputting a control signal according to the mode selection signal, the a constant voltage generator is for generating a plurality of voltage levels, and a selector switch is coupled to the control circuit and for selecting one of the voltage levels to be served as the frequency-selection voltage according to the control signal.

11. The method of claim 10, wherein the mode selection signal in the switching varactor unit is decoded and turns on corresponding varactor channels of the switching varactor unit, so as to change the capacitance.

* * * * *